(12) United States Patent
Kim et al.

(10) Patent No.: US 8,736,788 B2
(45) Date of Patent: May 27, 2014

(54) LIQUID CRYSTAL DISPLAY DEVICE HAVING IMPROVED COOLING EFFICIENCY

(75) Inventors: Sung Ki Kim, Yongin-si (KR); Won-nyun Kim, Gwacheon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1483 days.

(21) Appl. No.: 11/450,373

(22) Filed: Jun. 12, 2006

(65) Prior Publication Data
US 2006/0279216 A1    Dec. 14, 2006

(30) Foreign Application Priority Data
Jun. 13, 2005    (KR) .................. 10-2005-0050440

(51) Int. Cl.
G02F 1/1333    (2006.01)
G02F 1/1335    (2006.01)
H02B 1/00    (2006.01)
H05K 5/00    (2006.01)

(52) U.S. Cl.
USPC .............. 349/67; 349/58; 349/61; 349/64; 349/65; 349/161; 362/294; 362/580; 361/697; 361/676

(58) Field of Classification Search
CPC ............ G02F 1/133382; G02F 1/133385
USPC ............ 349/58, 61, 64–65, 67, 161; 362/294, 362/580; 361/697, 676
See application file for complete search history.

(56) References Cited

U.S. PATENT DOCUMENTS

| 3,981,427 A * | 9/1976 | Brookes .................. 228/122.1 |
| 2003/0007109 A1 | 1/2003 | Park |
| 2004/0004424 A1* | 1/2004 | Sakurai ...................... 313/110 |
| 2005/0073638 A1* | 4/2005 | Byun et al. .................. 349/156 |
| 2005/0141244 A1* | 6/2005 | Hamada et al. .............. 362/612 |
| 2005/0179850 A1* | 8/2005 | Du ............................. 349/150 |
| 2006/0139951 A1* | 6/2006 | Lee ............................ 362/612 |
| 2006/0292461 A1* | 12/2006 | Shives et al. ................. 430/7 |

FOREIGN PATENT DOCUMENTS

| CN | 2336378 | | 9/1999 |
| CN | 2630891 | * | 4/2003 |
| CN | 2630891 | | 8/2004 |
| CN | 1580896 | | 2/2005 |
| CN | 1603890 | | 4/2005 |
| CN | 1608184 | | 4/2005 |
| JP | 2003-279980 | | 10/2003 |
| KR | 2003-79777 | | 10/2003 |
| KR | 20-0347118 | | 3/2004 |

OTHER PUBLICATIONS

Chinese Office Action dated Jan. 4, 2008 issued in CN 2006-100912864.
Korean Office Action dated Oct. 4, 2006 issued in KR 2005-50440.

* cited by examiner

Primary Examiner — Lauren Nguyen
(74) Attorney, Agent, or Firm — Stanzione & Kim, LLP

(57) ABSTRACT

A liquid crystal display device includes a liquid crystal display panel, a light guide plate disposed on a lower part of the liquid crystal display panel, an LED circuit substrate disposed along at least one side of the light guide plate to accommodate an LED on a front surface thereof, and a heat transmission member having a first part that faces a lower surface of the light guide plate and a second part that is extendedly bent from the first part and faces the LED circuit substrate.

34 Claims, 5 Drawing Sheets

LIQUID CRYSTAL DISPLAY DEVICE HAVING IMPROVED COOLING EFFICIENCY

CROSS-REFERENCE TO RELATED APPLICATIONS

This application claims priority under 35 U.S.C. §119(a) from Korean Patent Application No. 2005-0050440, filed on Jun. 13, 2005, in the Korean Intellectual Property Office, the disclosure of which is incorporated herein by reference in its entirety.

BACKGROUND OF THE INVENTION

1. Field of the Invention

The present general inventive concept relates to a liquid crystal display, and more particularly, to a liquid crystal display having a light emitting diode (LED) as a light source.

2. Description of the Related Art

Recently, flat panel displays, such as a liquid crystal display (LCD), a plasma display panel (PDP), or an organic light emitting diode (OLED), have been widely developed to replace a conventional cathode ray tube (CRT).

The LCD comprises a liquid crystal display panel, which has a thin film transistor substrate, a color filter substrate, and a liquid crystal interposed between the thin film transistor substrate and the color filter substrate. Since the LCD is a non-light emitting apparatus, the LCD needs a backlight unit, which is disposed on a rear surface of the thin film transistor substrate, to supply light to the liquid crystal display panel. The amount of transmission of the light emitted from the backlight unit is controlled according to an array state of the liquid crystal. The LCD panel and the backlight unit are accommodated in a chassis.

The backlight unit can be classified as one of an edge type backlight and a direct type backlight according to a position of a light source. The edge type backlight has a structure in which the light source is disposed on a lateral part of a light guide plate. The edge type backlight is applied to a relatively small liquid crystal display, which is generally used in laptop and desktop computers. The edge type backlight is advantageous for having high uniformity of luminance, long lifetime, and thin thickness.

A light emitting diode (LED) has been widely used as the light source of the backlight unit due to its high brightness and excellent color realization. However, the LED generates much heat compared to other light sources, such as a cold cathode fluorescent lamp (CCFL) or an external electrode fluorescent lamp (EEFL). The heat from the LED may lower brightness and cause color shifts if it is not properly discharged.

Conventional backlight units use a radiating fin, a heat pipe, and a cooling fan to remove heat generated by the LED, thereby making the LCD heavier and thicker.

SUMMARY OF THE INVENTION

The present general inventive concept provides a liquid crystal display (LCD) that has a thin thickness and an excellent LED cooling efficiency.

Additional aspects and/or advantages of the present general inventive concept will be set forth in part in the description which follows and, in part, will be obvious from the description, or may be learned by practice of the present general inventive concept.

The foregoing and/or other aspects and utilities of the present general inventive concept can be achieved by providing a liquid crystal display device, comprising a liquid crystal display panel, a light guide plate disposed on a lower part of the liquid crystal display panel, an LED circuit substrate disposed along at least one side of the light guide plate to accommodate an LED on a front surface of the LED circuit substrate, and a heat transmission member having a first part that faces a lower surface of the light guide plate and a second part which extendedly bends from the first part and faces the LED circuit substrate.

The heat transmission member can comprise a first sub-layer formed across the first part and the second part of the heat transmission member, and a second sub-layer provided on at least a part of an external surface of the first sub-layer.

The first sub-layer can be made of aluminum.

A heat transmission of the second sub-layer can be larger than a heat transmission of the first sub-layer.

The second sub-layer can be made of graphite.

At least a part of the second sub-layer can be provided in the second part of the heat transmission member.

The heat transmission of the second sub-layer can be greater than or equal to about 400 W/m$^2$.

The LED circuit substrate can be made of metal.

The liquid crystal display can further comprise a gap pad disposed between the LED circuit substrate and the heat transmission member.

The liquid crystal display can further comprise a reflection plate disposed at a rear side of the light guide plate, the reflection plate comprising a first surface disposed on a lower part of the light guide plate, a second surface extendedly bent from the first surface and disposed between the light guide plate and the LED, and comprising an LED accommodating hole to accommodate the LED, and a third surface extended from the second surface parallel to the liquid crystal display panel to cover a part of the light guide plate.

The liquid crystal display can further comprise a reflection cover to reflect light from the LED toward the light guide plate and to accommodate the LED circuit substrate.

The liquid crystal display can further comprise a first gap pad disposed between the LED circuit substrate and the reflection cover, and a second gap pad disposed between the reflection cover and the heat transmission member.

The foregoing and/or other aspects and utilities of the present general inventive concept can also be achieved by providing a liquid crystal display unit, comprising a liquid crystal display panel, a first plate located on a bottom surface of the liquid crystal display panel to guide light to the liquid crystal display panel, a second plate located on a bottom surface of the first plate to reflect light to the first plate, a light source substrate having at least one light source to provide the light to the liquid crystal display panel through the first plate, and a first member located on a bottom surface of the second plate and contacting the light source substrate to transfer heat away from the at least one light source.

The second plate can comprise a first surface parallel to the bottom surface of the first plate, a second surface perpendicular to the first surface, and a third surface parallel to the first surface and separated from the first surface by the second surface. The light source substrate can be located on the second surface of the second plate. The third surface of the second plate can prevent light from the at least one light source from reaching the liquid crystal display panel without passing through the first plate. The second surface of the second plate can include at least one hole to accommodate the at least one light source of the light source substrate. The first member can comprise a first surface parallel to the bottom surface of the first plate, and a second surface perpendicular to the first surface and contacting the light source substrate. The first member can further comprise at least one additional surface perpendicular to the first surface. The liquid crystal display unit can further comprise a second member located on a surface of the first member and contacting the first member to transfer heat away from the at least one light source and the first member. The second member can comprise at least one of a first surface parallel to the bottom surface of the first plate, and a second surface perpendicular to the first surface and contacting the second surface of the first member.

The liquid crystal display panel can comprise a thin film transistor substrate, a color filter substrate, a sealant connecting the thin film transistor substrate and the color filter substrate, a closed space having a boundary defined by the thin film transistor substrate, the color filter substrate, and the sealant, and a liquid crystal layer located in the closed space. The first member can indirectly contact the light source substrate. The first member can indirectly contact the light source substrate through a plurality of intervening parts. The plurality of intervening parts can comprise a reflection part to reflect the light from the at least one light source to the first plate, and a heat transfer part to transfer the heat from the at least one light source to the first member.

The light source substrate can contact the first plate. The at least one light source can be located on a first surface of the light source substrate, and the first member can contact a second surface of the light source substrate. A heat transmission of the second member can be greater than a heat transmission of the first member. The heat transmission of the first member can be in a range of about 150 W/m$^2$ to about 400 W/m$^2$, and the heat transmission of the second member can be greater than or equal to about 400 W/m$^2$.

The foregoing and/or other aspects and utilities of the present general inventive concept can also be achieved by providing a display device, comprising a panel, a guide unit disposed at a rear side of the panel to guide light to the panel, a light source disposed on an outer portion of the guide unit to emit the light to the guide unit, and a heat transfer member to create a heat transfer path to transfer heat from the light source to outside of the display device at a rear side thereof.

The heat transfer member can operate without a cooling fan. The heat transfer member can have a surface area that is greater than or equal to a surface area of the panel. The heat transfer member can be parallel to the panel and can be exposed at a rear portion of the display device. The light source can be disposed at an edge of the guide unit. The heat member can form the heat transfer path to transfer heat in a first direction from the light source to a side portion of the display device and in a second directed from the side portion of the display device toward a rear portion of the device.

The foregoing and/or other aspects and utilities of the present general inventive concept can also be achieved by providing a display panel casing, comprising a cover, a guide unit disposed at a rear portion of the cover, a light source disposed at an edge portion of the guide unit, and a heat transmission member comprising a rear panel of the casing and forming a path to transfer heat from the light source to the rear panel. The heat transfer member can comprise a first portion that is the rear panel of the casing, and a second portion extending perpendicular to the first portion and extending between the cover and the guide unit to closely contact the light source.

The foregoing and/or other aspects and utilities of the present general inventive concept can also be achieved by providing a method of cooling a liquid crystal display apparatus, comprising transferring heat generated by a light source to a heat transfer member having a heat transmission of greater than or equal to 150 W/m$^2$, and transferring the heat from the heat transfer member to outside of the liquid crystal display apparatus. The method can further comprise transferring the heat from the heat transfer member to a secondary heat transfer member, and transferring the heat from the secondary heat transfer member to outside of the liquid crystal display apparatus.

BRIEF DESCRIPTION OF THE DRAWINGS

The above and/or other aspects and advantages of the present general inventive concept will become apparent and more readily appreciated from the following description of the embodiments, taken in conjunction with the accompany drawings of which.

DETAILED DESCRIPTION OF THE PREFERRED EMBODIMENTS

Figure 1:
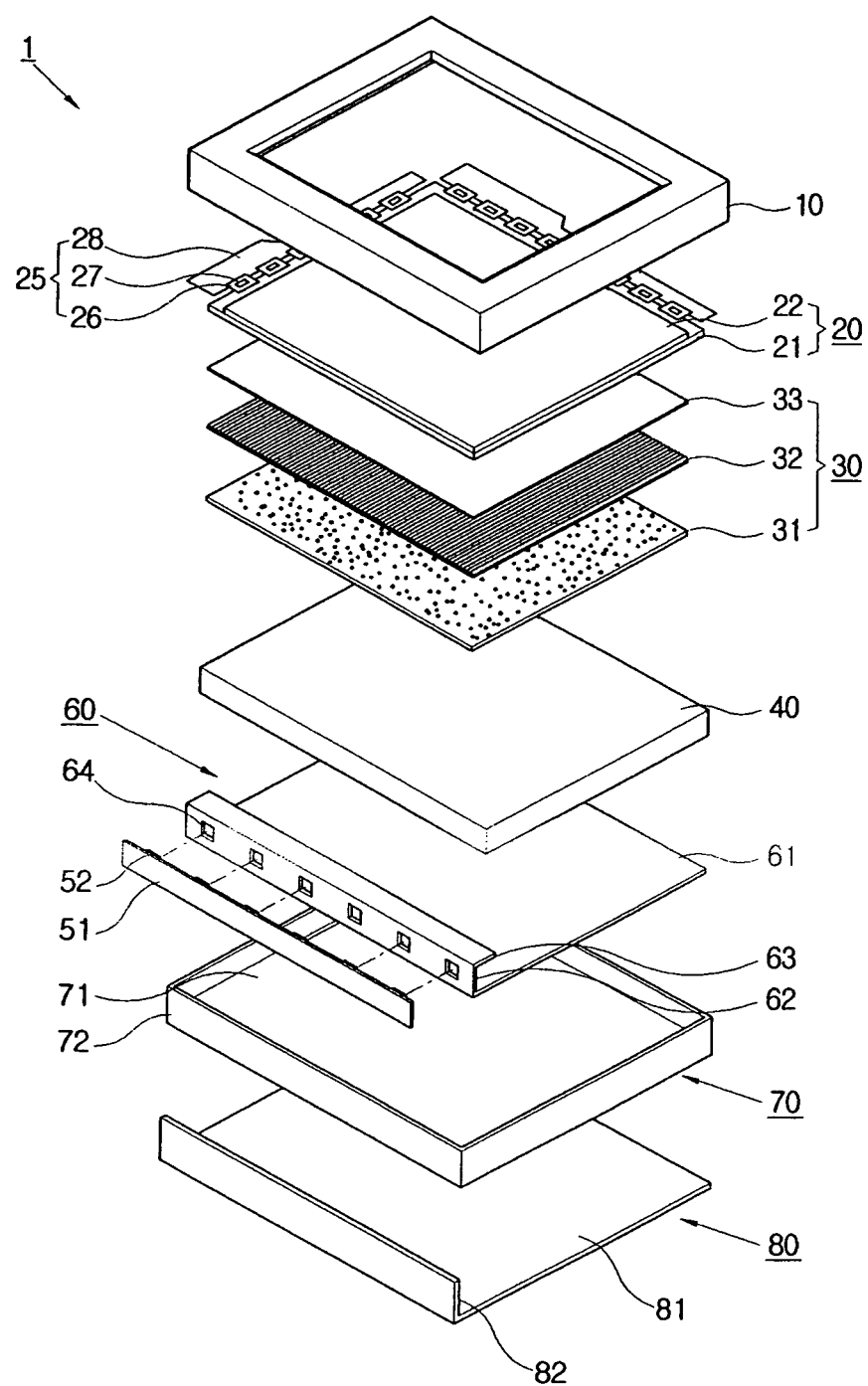
FIG. 1 is an exploded perspective view illustrating a liquid crystal display (LCD) device according to an embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

A liquid crystal display (LCD) device according to an embodiment of the present general inventive concept will be described with reference to FIGS. 1 and 2.

FIG. 1 is an exploded perspective view illustrating the LCD device according to this embodiment of the present general inventive concept. FIG. 2 is a sectional view illustrating the LCD according to this embodiment of the present general inventive concept.

A liquid crystal display (LCD) device 1 comprises a liquid crystal display panel 20, a light control member 30 disposed on a rear surface of the liquid crystal display panel 20, a light guide plate 40 disposed on a rear surface of the light control member 30, a light emitting diode (LED) circuit substrate 51 disposed on an incident surface of the light guide plate 40 to accommodate an LED 52, a reflection plate 60 disposed across a reflection surface, the incident surface, and an emitting surface of the light guide plate 40, a heat transmission member 70, and an auxiliary heat transmission member 80. The liquid crystal display panel 20, the light control member 30, and the light guide plate 40 are accommodated between a cover 10 and the heat transmission member 70.

Figure 2:
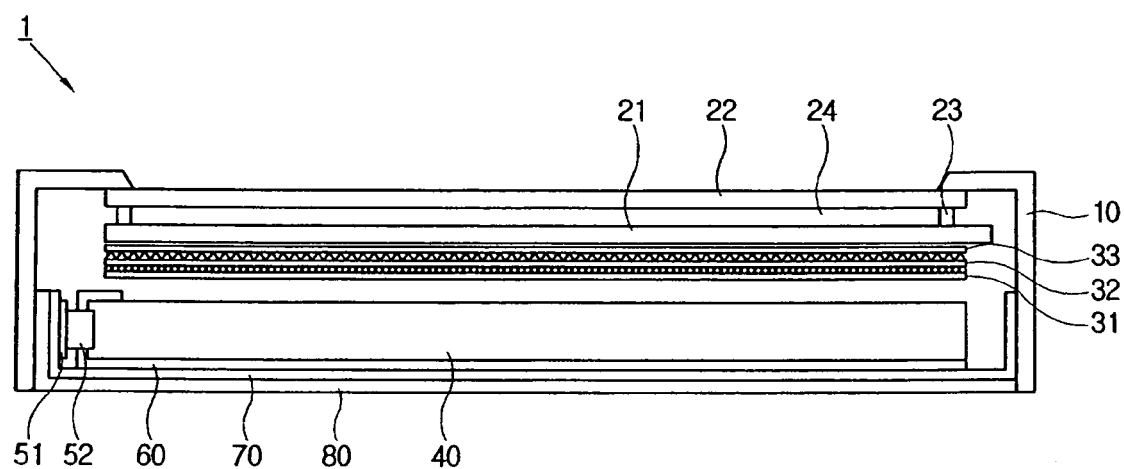
FIG. 2 illustrates a sectional view of the LCD device of FIG. 1.

Referring to FIGS. 1 and 2, the liquid crystal display panel 20 may comprise a thin film transistor substrate 21 that forms a thin film transistor on the liquid crystal display panel 20, a color filter substrate 22 to face the thin film transistor substrate 21, a sealant 23 to bond the thin film transistor substrate 21 and the color filter substrate 22 and to form a cell gap, and a liquid crystal layer 24 disposed between the thin film transistor substrate 21, the color filter substrate 22, and the sealant 23 in the cell gap. The liquid crystal display panel 20 displays a picture by controlling an alignment of liquid crystal molecules of the liquid crystal layer 24. As the liquid crystal display panel 20 is a non-light emitting element, the liquid crystal layer 24 receives light from the LED 52 of the LED circuit substrate 51. A driver 25 can be disposed on a first side of the thin film transistor substrate 21 to apply a driving signal. The driver 25 can comprise a flexible printed circuit (FPC) substrate 26, a driving chip 27 mounted in the FPC substrate 26, and a printed circuit board (PCB) 28 connected to a side of the FPC substrate 26. The driver 25 illustrated in FIG. 1 is an example of a chip on film (COF) method to configure the driver 25. However, other known methods include a tape carrier package (TCP), a chip on glass (COG), and the like to configure the driver 25. Alternatively, the driver 25 may be mounted in the thin film transistor substrate 21 to form a wire.

The light control member 30 disposed on the rear surface of the liquid crystal display panel 20 may comprise a diffusion film 31, a prism film 32, and a protection film 33.

The diffusion film 31 may comprise a base board and a coating layer having bead shaped members formed on the base board. The heat from the LED 52 is converted into plane light by the light guide plate 40 and is diffused by the diffusion film 31 to be uniformly supplied to the entire liquid crystal display panel 20.

The prism film 32 is formed with prisms, each of which are shaped like a triangular pillar and are disposed on an upper surface of the prism film 32 at a predetermined interval. The prism film 32 concentrates light diffused by the diffusion film 31 in a vertical direction toward the liquid crystal display panel 20. The prism film 32 may comprise two sheets, and forms a predetermined angle with a micro prism formed in the prism film 32. A majority of light passing through the prism film 32 passes vertically to produce a uniform brightness distribution. A reflection polarizing film (not illustrated) may be used together with the prism film 32 as necessary or as desired. Alternatively, only the reflection polarizing film may be used, without the prism film 32.

The protection film 33 is disposed on a top portion of the light control member 30. The protection film 33 protects the prism film 32 from scratching.

The light guide plate 40 disposed on the rear surface of the light control member 30 changes a path of light incident from the LED 52 disposed on a lateral part of the light guide plate 40 to supply plane light to the light control member 30. The light guide plate 40 comprises the incident surface to receive the light from the LED 52, the emitting surface to emit the light to the light control member 30, and the reflection surface to face the incident surface and to reflect some light that is not initially directed toward the light control member 30. The reflection surface may form a prism pattern (not illustrated), a V-cut pattern (not illustrated), and a diffusion pattern (not illustrated). The light guide plate 40 can be made of, for example, a transparent acryl material. The light guide plate 40 illustrated in FIGS. 1 and 2 is a plate type light guide plate. Alternatively, a wedge type light guide plate may be used.

The LED circuit substrate 51 is disposed along a first side (i.e., the lateral part) of the light guide plate 40.

The LED 52 is mounted in the LED circuit substrate 51 to face the light guide plate 40. Each LED 52 of an array of LEDs mounted on the LED circuit substrate 51 may emit a red light, a blue light, or a green light to supply a white light to the liquid crystal display panel 20. The LED 52 and the light guide plate 40 are spaced at a predetermined interval to mix the respective lights. The heat generated by the LED 52 is directly supplied to the LED circuit substrate 51. The LED circuit substrate 51 may be made of metal, such as aluminum having excellent heat transmission efficiency, to efficiently discharge heat to outside of the LCD device 1.

The reflection plate 60 comprises a first surface 61 disposed on a lower part of the light guide plate 40, a second surface 62 which extendedly bends from the first surface 61 to be disposed between the light guide plate 40 and the LED 52 and to form an LED accommodating hole 64 on the second surface 62 to accommodate the LED 52, and a third surface 63 which extends to be parallel to the liquid crystal display panel 20 from the second surface 62 and to cover a part of the light guide plate 40.

The first surface 61 sends light incident below from the reflection surface of the light guide plate 40 back to the light guide plate 40 to improve light efficiency. The second surface 62 prevents light from the LED 52 from being incident on the LED circuit substrate 51 through the LED accommodating hole 64. A size of the LED accommodating hole 64 can be similar to a size of the LED 52. The third surface 63 prevents light from the LED 52 from being directly incident on the light control member 30 without passing through the light guide plate 40. If light from the LED 52 does not pass through the light guide plate 40, a bright line may occur along a side part of a screen (not illustrated).

The reflection plate 60 may be made of, for example, polyethyleneterephthalate (PET) or polycabonate (PC).

The heat transmission member 70 accommodates the light guide plate 40, the LED 52, and the reflection plate 60. The heat transmission member 70 comprises a lower surface 71 disposed on a rear surface of the light guide plate 40, and a side surface 72 upwardly bent from the lower surface 71.

The heat transmission member 70 transmits heat generated by the LED 52 to outside of the LCD device 1. Thus, a part of the side surface 72 is in close contact with, or is closely adhered to, a rear surface of the LED circuit substrate 51. The heat transmission of the heat transmission member 70 can be about 150 $W/m^2$ or greater. For example, the heat transmission of the heat transmission member 70 can be in a range of about 150 $W/m^2$ to about 400 $W/m^2$, such as about 150 $W/m^2$ to about 300 $W/m^2$. The heat transmission member 70 may be made of, for example, aluminum.

The auxiliary heat transmission member 80 is attached to an external surface of the heat transmission member 70. The auxiliary heat transmission member 80 comprises a lower surface 81 disposed on the rear surface of the light guide plate 40 and a side surface 82 upwardly bent from the lower surface 81. The heat transmission of the auxiliary heat transmission member 80 can be larger than that of the heat transmission member 70. For example, the heat transmission of the auxiliary heat transmission member 80 can be about 400 $W/m^2$ or greater. Furthermore, the heat transmission of the auxiliary heat transmission member 80 may be in a range of about 400 $W/m^2$ to about 1,000 $W/m^2$. The auxiliary heat transmission member 80 may be made of, for example, graphite, and the like. Although the auxiliary heat transmission member 80 is disposed on both the lower surface 71 and the side surface 72 of the heat transmission member 70 in this embodiment of the present general inventive concept, the present general inventive concept is not so limited. Accordingly, in various embodiments of the present general inventive concept, the auxiliary heat transmission member 80 may comprise either the lower surface 81 or the side surface 82, as opposed to both of the lower surface 81 or the side surface 82.

The liquid crystal display 1 according to this embodiment of the present general inventive concept is smaller in size and better in LED cooling efficiency compared to a conventional liquid crystal display employing, for example, a radiating fin and/or a cooling fan. In fact, the liquid crystal display device 1 does not need a radiating fin or a cooling fan in order to cool efficiently.

Figure 3:
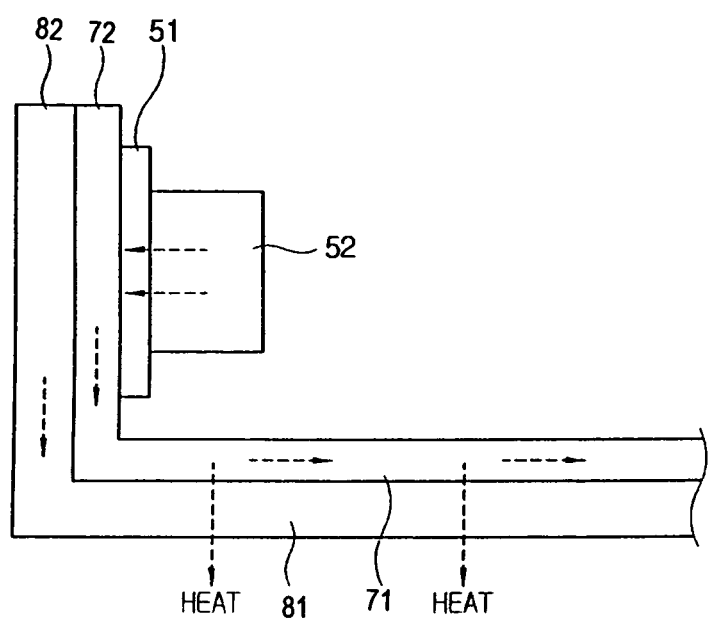
FIG. 3 illustrates a cooling flow of the LCD device of FIG. 1.

Hereinafter, the liquid crystal display device 1 according to the above-described embodiment of the present general inventive concept will be described in detail with reference to FIG. 3.

The LED 52 generates a large amount of heat while being driven. The heat from the LED 52 is transmitted to the LED circuit substrate 51. Since the LED circuit substrate 51 and the heat transmission member 70 are in close contact with, or are closely adhered to, each other, the heat moves to the heat transmission member 70. The heat transmitted to the heat transmission member 70 having high heat transmission passes through the side surface 72 of the heat transmission member 70 and the lower surface 71 efficiently.

As the heat transmission member 70 contacts (e.g., is adhered to) the auxiliary heat transmission member 80, the heat from the heat transmission member 70 moves to the auxiliary heat transmission member 80. The heat is efficiently transmitted to the lower surface 81 of the auxiliary heat transmission member 80 through the heat transmission member 70 as the heat transmission of the auxiliary heat transmission member 80 is larger than that of the heat transmission member 70. Furthermore, the heat is transmitted to the lower surface 81 of the auxiliary heat transmission member 80 to be quickly discharged to the outside, since a surface area of the lower surface 81 in contact with external air is large.

Each LED 52 is a point light source, thereby forming a plurality of hot spots in the LED circuit substrate 51. However, the heat is distributed across the auxiliary heat transmission member 80 by passing through the heat transmission member 70 and the auxiliary heat transmission member 80. Since the auxiliary heat transmission member 80 has a larger surface area in contact with external air, the liquid crystal display device 1 has a high LED cooling efficiency.

As described above, the LED 52 is efficiently cooled by the heat transmission member 70 and the auxiliary heat transmission member 80 in this embodiment of the present general inventive concept, without using conventional cooling devices, such as the radiating fin or the cooling fan. Accordingly, the liquid crystal display device 1 may be lighter, thinner and calmer as compared to a conventional LCD.

Hereinafter, a liquid crystal display according to another embodiment of the present general inventive concept will be described with reference to FIG. 4.

Figure 4:
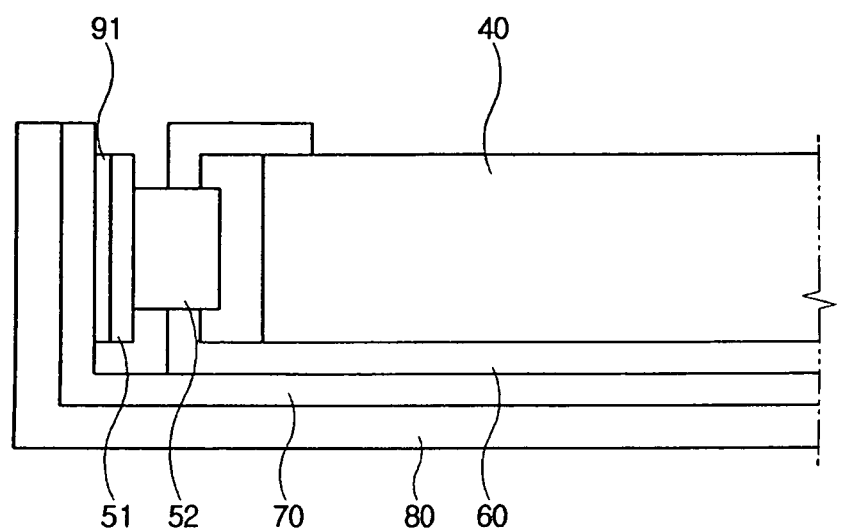
FIG. 4 is a sectional view illustrating main parts of a liquid crystal display (LCD) device according to another embodiment of the present general inventive concept.

As illustrated in FIG. 4, a liquid crystal display according to this embodiment of the present general inventive concept comprises a gap pad 91 disposed as an intervening part between an LED circuit substrate 51 and a heat transmission member 70. The gap pad 91 is a thin plate made of material having a high heat transfer coefficient, and can have a thickness of, for example, approximately 0.5 mm.

The LED circuit substrate 51 and the heat transmission member 70 may be made of metal having high heat transmission efficiency. Even though the LED circuit substrate 51 and the heat transmission member 70 are in close contact with, or are closely adhered to, each other, a hollow area is generated between the LED circuit substrate 51 and the heat transmission member 70 that lowers heat transmission efficiency. The gap pad 91 is in close contact with, or is closely adhered to, both the LED circuit substrate 51 and the heat transmission member 70, which are made of metal, to improve heat radiation efficiency. Heat from an LED 52 sequentially passes through the LED circuit substrate 51, the gap pad 91, and the heat transmission member 70 to be transmitted to an auxiliary heat transmission member 80.

Hereinafter, a liquid crystal display according to still another embodiment of the present general inventive concept will be described with reference to FIG. 5.

Figure 5:
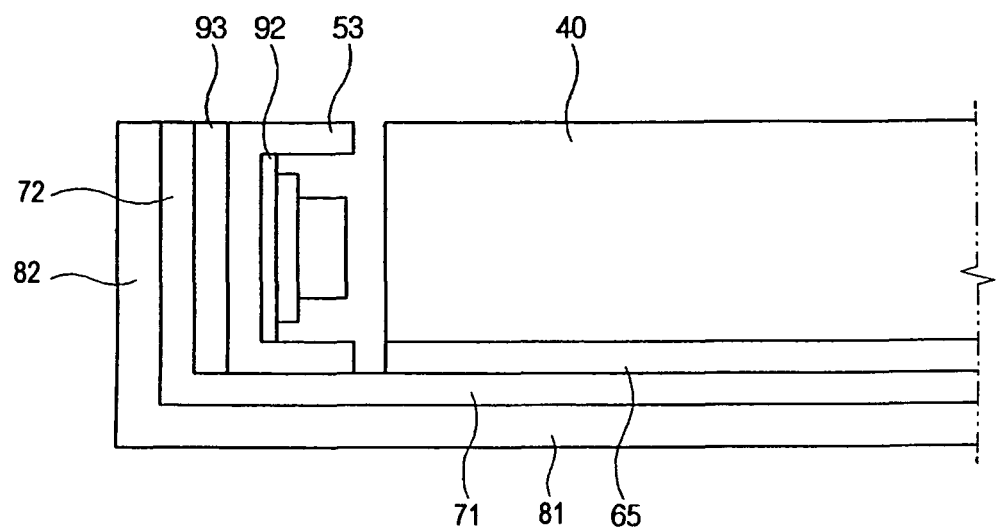
FIG. 5 is a sectional view illustrating main parts of a liquid crystal display (LCD) device according to still another embodiment of the present general inventive concept.

As illustrated in FIG. 5, a liquid crystal display according to this embodiment of the present general inventive concept comprises a simplified reflection plate 65. The liquid crystal display according to this embodiment further comprises a reflection cover 53 to cover an LED circuit substrate 51. Unlike in FIGS. 1-3, the reflection plate 65 according to this embodiment is disposed on a lower part of a light guide plate 40 alone (e.g., without being connected to the LED circuit substrate 51 or an LED 52). The reflection cover 53 reflects light from the LED 52 toward the light guide plate 40. The reflection cover 53 may be made of highly reflection-efficient metal. Gap pads 92 and 93 are disposed between the reflection cover 53 and the LED circuit substrate 51, and disposed between the reflection cover 53 and a heat transmission member 70, respectively. Heat from the LED 52 sequentially passes through the LED circuit substrate 51, the gap pad 92, the reflection cover 53, the gap pad 93, and the heat transmission member 70 to be transmitted to an auxiliary heat transmission member 80. The gap pads 92 and 93 and the reflection cover 53 are intervening parts disposed between the LED circuit substrate 51 and the heat transmission member 70.

Although the embodiments described above illustrate the heat transmission member 70 and the auxiliary heat transmission member 80 in the absence of conventional cooling devices, the present general inventive concept is not so limited. Accordingly, in various embodiments of the present general inventive concept, a heat transmission member and an auxiliary heat transmission member may be used together with one or more conventional cooling devices, such as a radiating fin, a heat pipe, a cooling fan, and an aluminum radiating plate, to improve LED cooling efficiency. Furthermore, although FIGS. 1-5 illustrate two distinct heat transmission members (i.e., the heat transmission member 70 and the auxiliary heat transmission member 80), the liquid crystal display device according to various embodiments of the present general inventive concept may include a single heat transmission member that includes a plurality of sub-layers. For example, the liquid crystal display device may include a single heat transmission member containing a first sub-layer (e.g., corresponding to the heat transmission member 70), and a second sub-layer (e.g., corresponding to the auxiliary heat transmission member 80).

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A liquid crystal display device, comprising:
   a liquid crystal display panel having a rear surface to receive light and a front surface to emit the received light;
   a light guide plate positioned to face the rear surface of the liquid crystal display panel to receive light into the light guide plate and having a front surface to emit the received light to the rear surface of the liquid crystal display panel;
   an LED circuit substrate having a front surface to face at least one side of the light guide plate and having an LED disposed on the front surface of the LED circuit substrate to emit the light into the at least one side of the light guide plate;

a first heat transmission member not directly contacting the light guide plate and having a first part including a first surface that faces the rear surface of the light guide plate and a second surface opposite the first surface, and a second part which extends from the first part and faces a rear surface of the LED circuit substrate;

a second heat transmission member not directly contacting the light guide plate and having a first part including a first surface to face the rear surface of the light guide plate and a second surface opposite the first surface, and a second part to transfer heat away from the rear surface of the LED circuit substrate and including a surface to contact the first surface of the first heat transmission member, the second surface of the first part provided on at least the first surface of the first heat transmission member and located between the first surface of the first heat transmission member and the light guide plate, the second surface of the second heat transmission member having a surface area smaller than the second surface of the first heat transmission member; and a reflection element disposed between the light guide plate and the second heat transmission member.

2. The liquid crystal display device according to claim 1, wherein the second heat transmission member is made of aluminum.

3. The liquid crystal display device according to claim 1, wherein a heat transmission of the first heat transmission member is larger than a heat transmission of the second heat transmission member.

4. The liquid crystal display device according to claim 1, wherein the first heat transmission member is made of graphite.

5. The liquid crystal display device according to claim 1, wherein the second part of the second heat transmission member is provided on the second part of the first heat transmission member.

6. The liquid crystal display device according to claim 1, wherein a heat transmission of the second heat transmission member is greater than or equal to about 400 W/m$^2$.

7. The liquid crystal display device according to claim 1, wherein the LED circuit substrate is made of metal.

8. The liquid crystal display device according to claim 1, further comprising:
a gap pad disposed between the LED circuit substrate and the second part of the second heat transmission member.

9. The liquid crystal display device according to claim 1, wherein the reflection element comprises:
a first surface disposed on a lower part of the light guide plate to correspond to a first plane;
a second surface extendedly bent from the first surface and disposed between the light guide plate and the LED circuit substrate, and comprising an LED accommodating hole to accommodate the LED, the second surface corresponding to a second plane that crosses the first plane; and
a third surface extended from the second surface, parallel to the liquid crystal display panel, and corresponding to a third plane that is parallel to and separate from the first plane, the third surface located between the entire LED and the liquid crystal display in a direction parallel to the second plane and covering a part of the light guide plate.

10. The liquid crystal display device according to claim 1, further comprising:
a reflection cover to reflect light from the LED toward the light guide plate and to accommodate the LED circuit substrate.

11. The liquid crystal display device according to claim 10, further comprising:
a first gap pad disposed between the LED circuit substrate and the reflection cover; and
a second gap pad disposed between the reflection cover and the heat transmission member.

12. A liquid crystal display device comprising:
a liquid crystal display panel;
a light guide plate which is disposed so as to be parallel to a lower surface of the liquid crystal display panel to transmit light from a side surface of the light guide plate to a front surface of the light guide plate facing the lower surface of the liquid crystal display panel;
an LED circuit substrate having a front surface and at least one LED, wherein the LED circuit substrate is disposed so that the front surface faces the side surface of the light guide plate and the at least one LED is disposed on the front surface of the LED circuit substrate to emit the light into the side surface of the light guide plate;
a first heat transmission member having a first part which is substantially parallel to a lower surface of the light guide plate and a second part which is substantially parallel to the front surface of the LED circuit substrate;
a second heat transmission member not directly contacting the light guide plate and provided on at least a part of one surface of the first heat transmission member to contact the second part of the first heat transmission member and to transfer heat away from a rear surface opposite the front surface of the LED circuit substrate; and
a reflection element disposed between the light guide plate and the second heat transmission member.

13. The liquid crystal display device according to claim 12, wherein the second heat transmission member includes a first part adjacent to the first part of the first heat transmission member, and
the first part of the second heat transmission member is adjacent to the lower surface of the light guide plate.

14. The liquid crystal display device according to claim 12, wherein the second heat transmission member includes a second part adjacent to the second part of the first heat transmission member, and
the second part of the second heat transmission member is adjacent to a side surface of the LED circuit substrate.

15. The liquid crystal display device according to claim 12, wherein the second heat transmission member spans across an entire lower surface of the reflection element.

16. The liquid crystal display device according to claim 12, wherein the second heat transmission member is made of aluminum.

17. The liquid crystal display device according to claim 1, wherein the second surface of the first heat transmission member is exposed to air.

18. The liquid crystal display device according to claim 12, wherein the first part of the first heat transmission member includes a first surface facing the lower surface of the light guide plate and a second surface opposite the first surface,
the second heat transmission member includes a first part having a first surface facing the lower surface of the light guide plate and a second surface opposite the first surface, the second surface contacting the first surface of the first part of the first heat transmission member, and
the second surface of the first heat transmission member has a surface area greater than the second surface of the second heat transmission member.

19. The liquid crystal display device according to claim 12, wherein the first heat transmission member is made of graphite.

20. The liquid crystal display device according to claim 1, wherein the second heat transmission member contacts the LED circuit substrate.

21. The liquid crystal display device according to claim 1, wherein the second heat transmission member directly contacts the first heat transmission member.

22. A liquid crystal display device, comprising:
a liquid crystal display panel;
a light guide plate disposed on a lower part of the liquid crystal display panel to receive light into at least one side of the light guide plate and to emit the light to the liquid crystal display panel;
an LED circuit substrate having a front surface to face the at least one side of the light guide plate and having an LED disposed on the front surface of the LED circuit substrate to emit the light into the light guide plate;
a first heat transmission member which houses at least a portion of the light guide plate and a portion of the LED circuit substrate;
a second heat transmission member not directly contacting the light guide plate and disposed on the first heat transmission member, a first surface of a first portion of the second heat transmission member facing a bottom surface of the LED circuit substrate, and a second portion of the second heat transmission member being arranged to transfer heat away from a rear surface of the LED circuit substrate opposite the front side; and
a reflection element disposed between the light guide plate and the second heat transmission member,
wherein the first heat transmission member houses a portion of the second heat transmission member, and
wherein a heat transmission of the first heat transmission member is larger than a heat transmission of the second heat transmission member.

23. The liquid crystal display device according to claim 22, wherein at least a part of the second heat transmission member contacts the bottom surface of the LED circuit substrate.

24. The liquid crystal display device according to claim 22, wherein the second heat transmission member is provided on at least a part of a surface of the first heat transmission member.

25. The liquid crystal display device according to claim 23, wherein the second portion of the second heat transmission member contacts the rear surface of the LED circuit substrate, and a second surface of the first portion of the second heat transmission member opposite the first surface contacts a top surface of the first heat transmission member.

26. The liquid crystal display device according to claim 22, wherein the second heat transmission member spans across an entire lower surface of the reflection element.

27. The liquid crystal display device according to claim 1, further comprising:
an LED contact area between the LED substrate and the LED at which the LED contacts the LED substrate;
a first heat transmission contact area between the LED substrate and the second part of the second heat transmission member at which the second heat transmission member contacts the LED substrate; and
a second heat transmission contact area between the second part of the first heat transmission member and the second part of the second heat transmission member at which the second heat transmission member contacts the first heat transmission member,
wherein the LED contact area is smaller than the first and second heat transmission contact areas.

28. The liquid crystal display device according to claim 1, further comprising:
an LED contact area between the LED substrate and the LED;
a first heat transmission contact area between the LED substrate and the second part of the second heat transmission member at which the second heat transmission member contacts the LED substrate; and
a second heat transmission contact area between the second part of the first heat transmission member and the first part of the second heat transmission member at which the second heat transmission member contacts the first heat transmission member,
wherein the first heat transmission contact area is smaller than the second heat transmission contact area.

29. The liquid crystal display device according to claim 1, wherein the second heat transmission member further includes at least one third part extending from the first part in a same direction as the second part, such that the second part and the at least one third part form walls extending from the first part, and
at least portions of the LED circuit substrate and the light guide plate are located within a volume defined by the first part, the second part, and the at least one third part of the second heat transmission member.

30. The liquid crystal display device according to claim 29, wherein the at least one third part of the second heat transmission member includes a first surface facing the light guide and a second surface opposite the first surface, the second surface being exposed to air,
wherein a sum of the surface area of the second surface of each of the at least one third part is less than a surface area of the second surface of the first part of the first heat transmission member.

31. The liquid crystal display device according to claim 1, wherein the first heat transmission member is a plate that is attached to the second heat transmission member.

32. A liquid crystal display (LCD) device, comprising:
an LCD panel;
a light guide to emit light to a rear surface of the LCD panel;
an LED circuit substrate having a front surface and at least one LED mounted on the front surface to emit the light into at least one side surface of the light guide, the front surface of the LED circuit substrate being disposed to face the at least one side surface of the light guide;
a reflection plate to cover the at least one side surface and a rear surface of the light guide and having at least one opening to accommodate the at least one LED;
a heat transmission member having a base and side walls to receive within a volume defined by the base and side walls at least a portion of each of the reflection plate, the LED circuit substrate, and the light guide, a portion of the reflection plate that covers the rear surface of the light guide being mounted to the base of the heat transmission member, one of the side walls being arranged to transfer hear away from a rear surface opposite the front surface of the LED circuit substrate;
an auxiliary heat transmission member not directly contacting the light guide plate and mounted to at least the base of the heat transmission member on a side opposite the reflection plate to contact and cover the side of the heat transmission member opposite the reflection plate and having a heat transmission property greater than that of the heat transmission member; and
a reflection element disposed between the light guide plate and the auxiliary heat transmission member.

33. A liquid crystal display device, comprising:
a liquid crystal display panel;

a light guide plate disposed to be parallel to a lower surface of the liquid crystal display panel to transmit light from a side surface of the light guide plate to a front surface of the light guide plate facing the lower surface of the liquid crystal display panel;

an LED circuit substrate having a front surface and at least one LED, wherein the LED circuit substrate is disposed so that the front surface faces the side surface of the light guide plate and the at least one LED is disposed on the front surface of the LED circuit substrate to emit the light into the side surface of the light guide plate;

a first heat transmission member having a first part which is substantially parallel to a lower surface of the light guide plate and a second part which is substantially parallel to the front surface of the LED circuit substrate; and a second heat transmission member not directly contacting the light guide plate and having a first surface coupled to the first part of the first heat transmission member and a second surface adjacent to the first surface and coupled to a rear surface of the LED circuit substrate such that the first heat transmission member transfers heat away from the rear surface of the LED circuit substrate via the second heat transmission member.

34. A liquid crystal display device, comprising:

a liquid crystal display panel;

a light guide plate disposed to be parallel to a lower surface of the liquid crystal display panel to transmit light from a side surface of the light guide plate to a front surface of the light guide plate facing the lower surface of the liquid crystal display panel;

an LED circuit substrate having a front surface and at least one LED, wherein the LED circuit substrate is disposed so that the front surface faces the side surface of the light guide plate and the at least one LED is disposed on the front surface of the LED circuit substrate to emit the light into the side surface of the light guide plate;

a first heat transmission member having a surface parallel to a lower surface of the light guide plate to transfer heat away from the LED circuit substrate in a direction perpendicular to the lower surface of the light guide plate;

a second heat transmission member having a first surface coupled to the surface of the first heat transmission member and a second surface adjacent to the first surface and coupled to a rear surface of the LED circuit substrate to transfer the heat to the first heat transmission member; and a reflection member disposed between the light guide plate and the second heat transmission member.

* * * * *